United States Patent
Yamamoto et al.

(10) Patent No.: US 7,622,671 B2
(45) Date of Patent: Nov. 24, 2009

(54) ATTACHMENT STRUCTURE FOR ELECTRIC JUNCTION BOX

(75) Inventors: Tatsuya Yamamoto, Shizuoka (JP); Masatoshi Egawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 379 days.

(21) Appl. No.: 10/554,550

(22) PCT Filed: Apr. 8, 2004

(86) PCT No.: PCT/JP2004/005064
§ 371 (c)(1),
(2), (4) Date: Oct. 27, 2005

(87) PCT Pub. No.: WO2004/097996
PCT Pub. Date: Nov. 11, 2004

(65) Prior Publication Data
US 2006/0292902 A1    Dec. 28, 2006

(30) Foreign Application Priority Data
Apr. 28, 2003 (JP) .............................. 2003-123318

(51) Int. Cl.
*H02G 3/08* (2006.01)
(52) U.S. Cl. .............................. 174/50; 174/520; 174/61; 174/481; 439/76.1; 439/76.2; 439/573
(58) Field of Classification Search ............... 174/50, 174/53, 57, 58, 59, 480, 481, 503, 489, 520, 174/559, 61; 220/3.2, 3.3, 3.4, 3.5, 3.6, 3.7, 220/3.8, 3.9, 4.02; 439/76.1, 76.2, 949, 535, 439/563, 573
See application file for complete search history.

(56) References Cited

U.S. PATENT DOCUMENTS

| 5,405,035 | A  | * | 4/1995 | Kato ........................... 220/3.8 |
| 5,868,583 | A  | * | 2/1999 | Naitou et al. ............... 439/76.2 |
| 6,728,110 | B2 | * | 4/2004 | Koyama ..................... 439/76.1 |
| 6,753,472 | B2 | * | 6/2004 | Ito ................................ 174/50 |
| 6,786,740 | B2 | * | 9/2004 | Ito ............................. 439/76.2 |
| 7,255,597 | B2 | * | 8/2007 | Nakamura et al. .......... 439/535 |
| 2003/0042034 | A1 |   | 3/2003 | Roesch et al. |

FOREIGN PATENT DOCUMENTS

| JP | 2000232716 A | * | 8/2000 |
| JP | 2000-350331 |   | 12/2000 |
| JP | 2002-330520 |   | 11/2002 |

* cited by examiner

*Primary Examiner*—Angel R Estrada
(74) *Attorney, Agent, or Firm*—Kratz, Quintos & Hanson, LLP

(57) ABSTRACT

A junction block includes attaching brackets projected from the upper wall and lower wall of a block body. The block body is attached to a body panel through the attaching brackets. The attaching bracket to be pulled is provided with a recess 15b and/or a hole 15a for inducing rupture. When a wire harness derived from the block body is pulled in a vehicle width direction during recovery of the junction block, the block body is ruptured-separated from the attaching bracket at the recess 15b and/or hole 15c. In such a configuration, the block body can be rupture-separated only during recovery of a junction box body without being ruptured-separated owing to vibration/shock during vehicle running to improve recovery workability and recycling property.

20 Claims, 3 Drawing Sheets

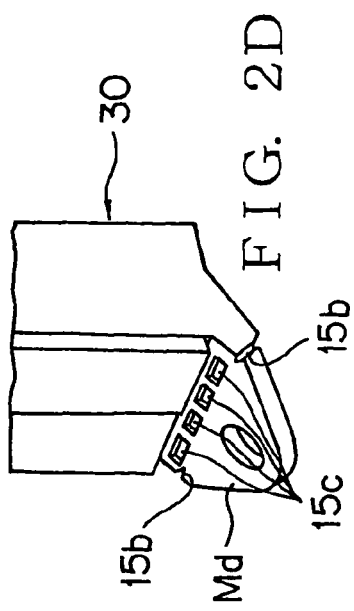
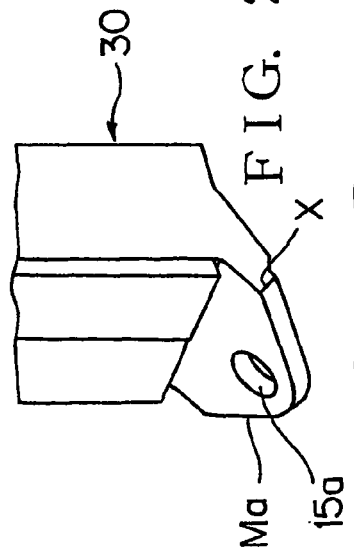
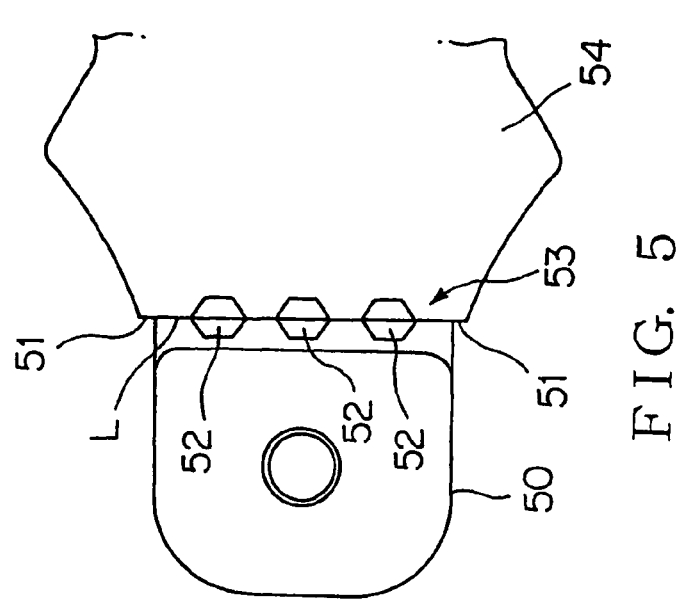
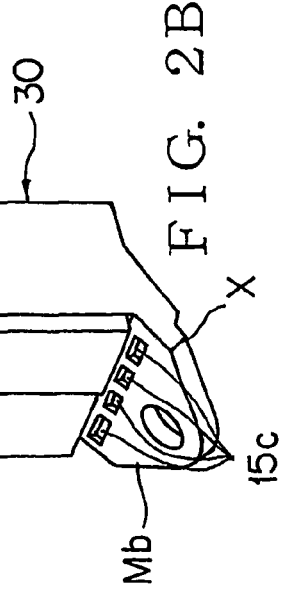

ATTACHMENT STRUCTURE FOR ELECTRIC JUNCTION BOX

TECHNICAL FIELD

The present invention relates to an attachment structure for an electric junction box attached to a body panel of a motor vehicle and connected to a wire harness, or an electric junction box useful for recovery of a protector.

BACKGROUND ART

A large number of long members, e.g. wire harnesses are arranged within a motor vehicle. These wire harnesses are connected to a junction block, a relay block, a connector block, ECU BOX, a protector, etc. which serve as an electric junction box to be fixed to a body panel. For example, as seen from FIG. 4, a junction block 10 fixed to the one panel side 20a of a body panel 20 by a tightening screw (not shown) and another junction box 10 fixed to the other panel side 20b thereof are connected to each other through a wire harness 25. The wire harness 25 is arranged along a reinforcement member 21.

When the vehicle is subjected to the first dismantling (which is carried out for "recycling" of the components which can be "recycled"), with a J hook 26 hung on the wire harness 25, the J hook 26 is pulled upward from the body panel 20 to recover the junction blocks 10.

However, since the junction blocks 10 are firmly fixed using the tightening screws so that they do not fall owing to vibration during vehicle running, when the J hook 26 is pulled, the wire harness 25 may be broken or the connectors connected to the junction blocks 10 may come off. As a result, only the junction blocks may be left in the body panel 20.

When the junction blocks 10 are left, the tightening screws passed through attaching brackets 15 and 17 of each of the junction blocks 10 must be loosened using e.g. an impact wrench to detach the junction blocks in a posture having bent his knees. This increases the man-hour of separately detaching the junction blocks, thus deteriorating recovery workability.

In order to overcome such inconvenience, an attaching structure of an electric junction box capable of recovering the junction block fixed to the body panel has been proposed in JP-A-2000-350331 (pages 2-3, FIG. 3).

The proposed junction block includes a body 54 within which a fuse or relay is accommodated and an attaching bracket 50 provided on the body 54 and fixed to the body panel (FIG. 5). The attaching bracket 50 has a tongue shape. The attaching bracket 50 is formed to project from the side of the body 54 and fixed to the body panel using a tightening screw.

A breakage portion 53 is formed on the attaching bracket 50. Recesses 51 and holes 52 located on the same line L as that of the recesses 51 are formed on the breakage portion 53. The planar area of the breakage portion 53 is made smaller than that of the surrounding portion so that stress is concentrated to the breakage portion 53, thereby separating the body 54 and attaching bracket 50 from each other by external force.

In accordance with such a configuration, when external force acts on the junction block, a crack is generated in the breakage portion 53 of the attaching bracket 50. The crack is developed on the line L connecting the recesses 51 and holes 52. Thus, the body 54 can be recovered without damaging the body 54.

However, the attaching structure for the conventional electric junction box has the following problem to be solved.

When unexpected external force acts on the breakage portion 53 owing to vibration or shock during vehicle running, the breakage portion 53 may be inadvertently broken. When the breakage portion 53 is broken, the junction block comes off and dangles from the body panel. Further, a connector comes off from the junction block so that it is placed in a non-conducting state. The wire harness will be also broken. The junction block itself will collide with the body panel and will be damaged.

The present invention intends to provide an attaching structure for an electric connection block which is rupture-separated only during recovery of a junction box body without being ruptured/broken owing to vibration/shock during vehicle running to improve recovery workability and recycling property.

DISCLOSURE OF INVENTION

In order to attain the above object, there is provided an attaching structure for an electric junction box with a junction box body fixed to a vehicle body through attaching portions, the box body being rupture-separated from the attaching portion during recovery of the junction box body, wherein the attaching portions are provided on the upper and lower walls of the junction box body, and one of the attaching portions, which is to be subjected to pulling force, is provided with a rupture inducing area so that when an electric wire derived from the junction box body is pulled during recovery of the junction box body, the junction box body is rupture-separated from the attaching portion at the rupture inducing area.

In accordance with the configuration described above, since the junction box body is firmly fixed to the vehicle body through the attaching portion, when unexpected external force acts on the junction box body owing to vibration or shock during vehicle running, the junction box body is prevented from coming off from the vehicle body.

On the other hand, during recovery of the junction box body, when the electric wire is pulled in a vehicle width direction, the one attaching portion is placed in a pulled state. At this time, stress is concentrated to the rupture inducing portion. When the tensile stress thus concentrated exceeds that of the attaching portion, crack is generated and the one attaching portion is ruptured. Subsequently, the other attaching portion is placed in the pulled state and is likewise ruptured.

The present invention is an attaching structure for an electric junction box, wherein the rupture inducing portion is a recess and/or hole.

In accordance with the configuration, the planar area of the one attaching portion is reduced so that the value of stress is increased. This is likely to induce rupture.

The present invention is an attaching structure for an electric junction box, wherein the recess is provided at each of both sides of the attaching portion.

In accordance with the above configuration, when the electric wire is pulled, the junction box body is twisted. At this time, stress is concentrated to each recess. Crack is developed to connect the recesses on both sides to rupture the attaching portion. After the one attaching portion has been completely ruptured, the other attaching portion is changed from a compressed state into the pulled state and ruptured.

The present invention is an attaching structure for an electric junction box, wherein the hole is one of a plurality of holes made in the one attaching portion.

In accordance with this configuration, stress is concentrated to the edge of each of the plurality of holes. Crack is developed to connect the plurality of holes. After the one attaching portion has been completely ruptured, the other attaching portion is changed from a compressed state into the pulled state and ruptured.

The present invention is an attaching structure for an electric junction box, wherein the rupture inducing portion is located at a position where main stress of the one attaching portion exists.

In accordance with this configuration, the stress to be concentrated to the rupture inducing portion is increased so that the junction box body is likely to be ruptured from the attaching portion. Now, the main stress refers to maximum vertical stress (maximum tensile stress) composed of bending stress and tensile stress which are generated when the electric wire is pulled.

The present invention is an attaching structure for an electric junction box, wherein breakage strength of the attaching portion is smaller than that of the electric wire.

In accordance with this configuration, when the electric wire is pulled, the electric wire is prevented from broken before the junction box body is ruptured from the attaching portion.

BRIEF DESCRIPTION OF DRAWINGS

FIG. 2A is an enlarged perspective view of an attaching bracket shown in FIG. 1 in the state where no recess or hole is formed;

FIG. 2B is an enlarged perspective view of an attaching bracket shown in FIG. 1 in the state where holes are formed;

FIG. 2C is an enlarged perspective view of an attaching bracket shown in FIG. 1 in the state where recesses are formed;

FIG. 2D is an enlarged perspective view of an attaching bracket shown in FIG. 1 in the state where the holes and recesses are formed;

FIG. 5 is a plan view showing another conventional attaching structure for an electric junction box.

BEST MODE OF CARRYING OUT THE INVENTION

Figure 1:
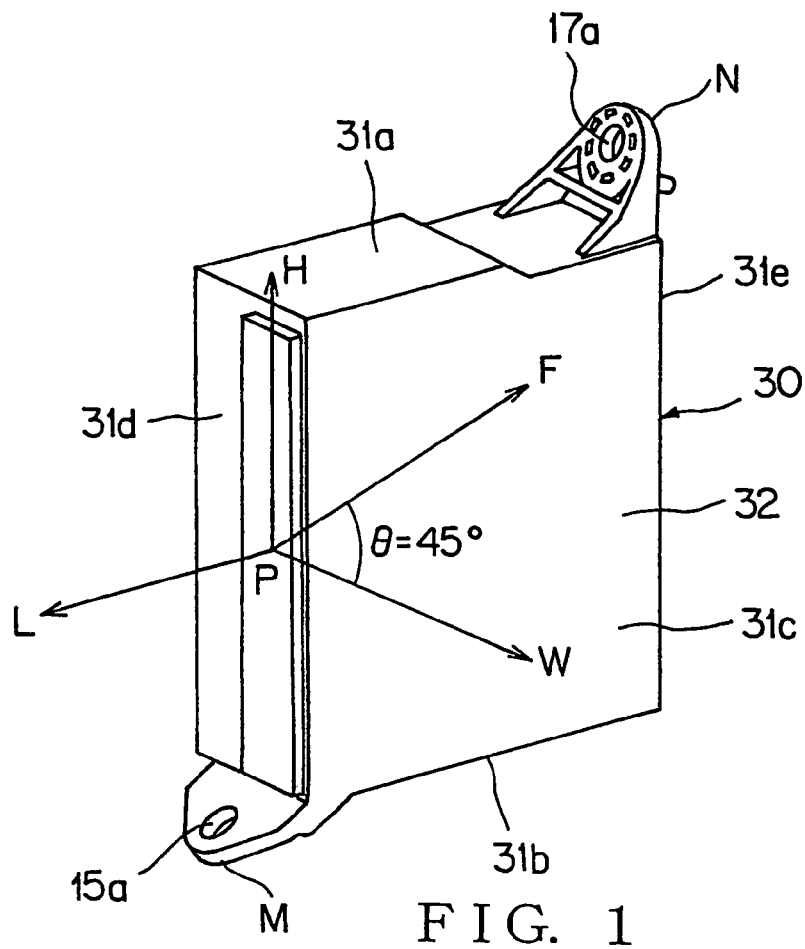
FIG. 1 is a perspective view of an analysis model of the attaching structure of a junction block (electric junction box) according to the present invention.
Figure 4:
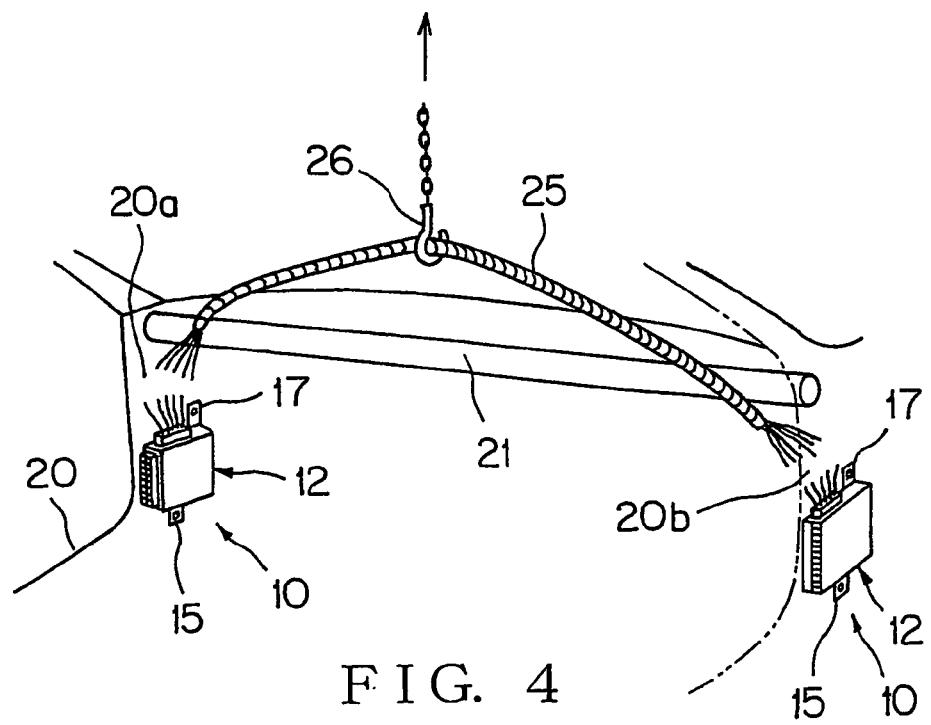
FIG. 4 is a view showing a conventional attaching structure for an electric junction box in the state where the wire harness has been broken owing to pulling force applied to the J-hook.

Now referring to the drawings, an explanation will be given of an embodiment of the present invention.

FIGS. 1 to 3 show views showing an embodiment of the attaching structure for an electric junction box. In FIGS. 1 to 3, like reference numerals refer to like parts in the conventional electric junction box.

A junction block 10 which serves as an electric junction box shown in FIG. 3 is a vehicle component which incorporates a branch circuit unit made of a bus bar, an electric wire, etc. and fixed to a body panel (on the side of the vehicle body) 20 of an engine room or passenger room of a vehicle such as a motor vehicle using a tightening member such as a screw.

The junction block 10 according to the present invention has attaching brackets (attaching portions) 15 and 17 which project on the upper wall 13a and lower wall 13b of a block body (junction box body) 12. The block body 12 is fixed to the body panel 20 through the attaching brackets 15 and 17. The lower attaching bracket (one attaching portion), which is subjected to pulling, is provided with a recess (rupture inducing area) 15b and/or a hole (rupture inducing area) 15c. While the junction blocks 10 are recovered, since the wire harness (electric wire) 25 extracted from the block bodies 12 is pulled in a vehicle width direction x (F direction at an angle of θ=45 degree from the W axis on the plane (0, 1, 1) in three axes (L, W, H) in FIG. 1), the junction blocks 10 are ruptured from the recesses 15b and/or holes 15c. The recesses 15b and holes 15c are provided at the positions where main stress exists on the basis of the result of the stress analysis using finite-element analysis.

In accordance with such a configuration, when the wire harness 25 is pulled in the vehicle width direction x, the lower attaching bracket 15 is placed in a pulled state so that stress is concentrated to the recesses 15b and/or edges of holes 15c. When the pulling stress exceeds the pulling stress of the attaching bracket 15, the lower attaching bracket 15 is ruptured. Subsequently, the upper attaching bracket 17 is placed in the pulled state so that the attaching bracket 17 is ruptured from its base.

The lower attaching bracket 15 which is ruptured earlier is ruptured only when the wire harness 25 is pulled in a specific direction (F direction at an angle of θ=45 degree from the W axis on the plane (0, 1, 1) in three axes (L, W, H) orthogonal to one another in FIG. 1). In other cases, for example, the lower attaching bracket 15 is not ruptured owing to unexpected external force such as vibration, shock, etc. during vehicle running, external force in the longitudinal direction y and vertical direction z of the vehicle body, etc. so that reliability of the electric connection during vehicle running is maintained.

Since the recesses 15b and holes 15c are provided on the positions where the main stress exists, the highest stress is concentrated to the edge of the recesses 15b and/or edges of holes 15c so that the attaching bracket 15 is likely to be ruptured.

An explanation will be given of the result of the linear structure analysis using the finite-element method.

In the linear structure analysis, stress analysis carried out for an analysis model 30 shown in FIG. 1 to acquire the position of the main stress of a lower attaching bracket M and the value of the main stress. As the analysis model 30, in order to enhance the reliability of the analysis result, a three-dimensional model having the same shape as that of an actual junction block 10 (FIG. 3) is used.

The analysis model 30 includes a square-box like block body 32 and attaching brackets M and N. Incidentally, the analysis model 30 may be a relay block, a connector block, ECU BOX, protector, etc. instead of the junction block 10.

With regard to the junction block 10, as shown in FIG. 3, actually, the wire harness 25 is connected to the rear wall 13d of the block body 12 through a connector 25a. The wire harness 25 is adapted to be pulled in the vehicle width direction when the junction blocks 10 are recovered. Incidentally, the connector 25a, which is locked in a connector fitting portion by a locking means, is adapted to not come off when the wire harness 25 is pulled.

The wire harness 25 has strength enough to not cut when it is pulled during the recovery of the block bodies 10. Inversely, the breakage strength of the attaching brackets 15 and 17 is smaller than that of the wire harness 25. Therefore, even when the wire harness 25 is pulled, it is not broken before the block body 1 is separated from the attaching brackets 15 and 17.

The analysis model 30 is completely restrained so that the upper and lower attaching brackets N and M are not allowed to make rotation or any movement. The analysis model 30 is fixed to generate bending moment and counter force in a three-axis direction. The load as external force is pulling load. The acting position P of the load is set at the central portion of the rear wall 31d. The acting direction of the load is an F direction at an angle of q=45° from the W axis on the plane (0, 1, 1) in three axes (L, W, H) orthogonal to one another in FIG. 1. The magnitude of load is 300N.

Now, in the directions in the three axes (L, W, H), the direction L is a direction in which a front wall 31e and a rear wall 31d are opposite to each other (the direction of the entire length of the vehicle); the direction W is a direction in which both side walls 31c are opposite to each other; and the direction H is a direction in which an upper wall 31a and a lower wall 31b are opposite to each other (direction of the height of the vehicle). The physical properties are tensile strength (37.2 Mpa) and shearing strength (36.7 Mpa).

FIGS. 2A to 2D are enlarged perspective views of the attaching bracket M of the analysis model 30, respectively. FIG. 2A shows an attaching bracket Ma provided with no hole 15c and no recess 15b. FIG. 2B shows an attaching bracket Mb with holes 15c. FIG. 2C shows an attaching bracket Mc with recesses 15b. FIG. 2D shown an attaching bracket Md provided with holes 15c and recesses 15b.

With regard to the attaching bracket Ma shown in FIG. 2A, main stress exists at the position of the edge X on the base side and its value is 29.2 Mpa.

With regard to the attaching bracket Mb shown in FIG. 2B, main stress exist at the position of the edge of each 15c and its value is 20.0 Mpa. It seems that the main stress has been reduced owing to stress dispersing effect.

With regard to the attaching bracket Mc shown in FIG. 2C, main stress exists at the position of each recess 15b and its value is 44.8 Mpa. Each recess 15b is located at the position of the edge on the base side illustrated in FIG. 2A. It seems that the main stress has been increased owing to the stress concentrating effect. It seems that since the main stress value exceeds the tensile strength and shearing strength of the attaching bracket M, rupture is generated at the position of the recess 15b. Incidentally, in an actual experiment result, it was confirmed that when the wire harness 25 is pulled by force of about 400 N, the block body 12 is separated from the position of the recess 15b.

With regard to the bracket Md shown in FIG. 2D, the main stress exists at the edge of each hole 15c and each recess 15b, and its main stress is 42.7 Mpa. It seems that the main stress has been reduced owing to the stress dispersing effect like the case of FIG. 2B.

In accordance with the result of the structure analysis by the finite element method, it has been found that provision of the recess 15b at the position X of the main stress of the attaching bracket Ma leads to concentration of stress and the main stress is increased. It seems that rupture is generated from the position of the recess 15b in the actual junction block 10.

Where the holes 15c are formed in the attaching brackets Mb and Md, the stress value is reduced as compared with the recesses are formed. However, it has been found that the main stress exists at the edge of each hole 15c. It has been also found that the stress value can be increased by changing the number of the holes 15c and their shape.

Figure 3A:
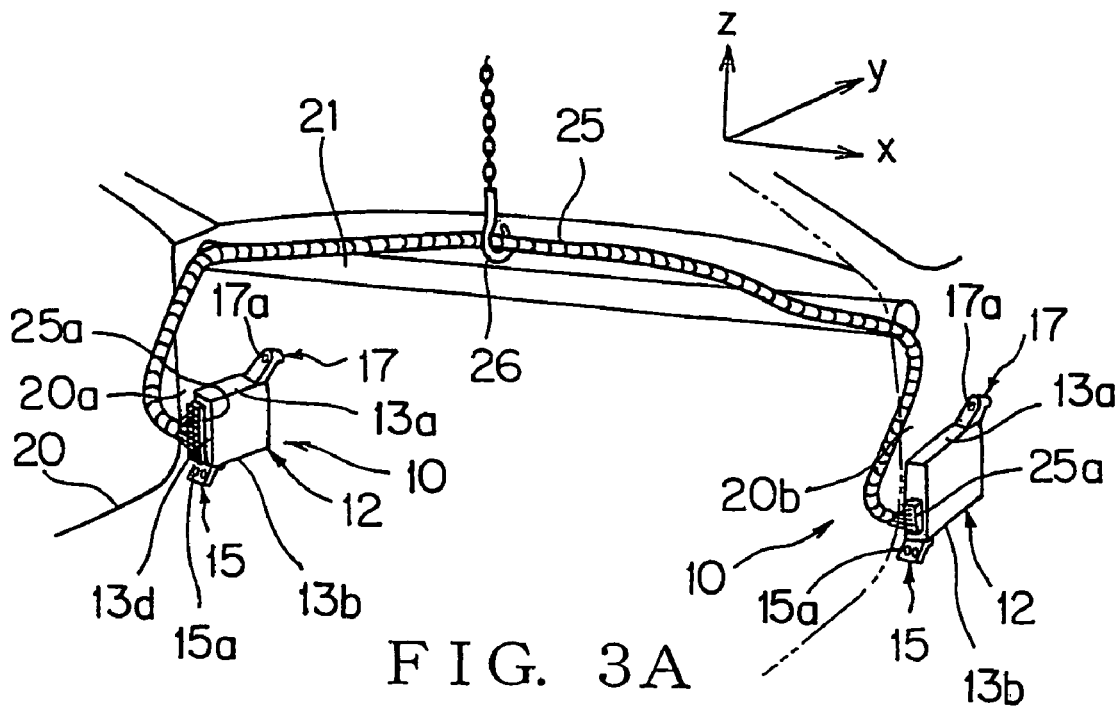
FIG. 3A is a perspective view showing the state where the wire harness and junction box are being recovered when a J hook has been just hung.

An explanation will be given of the manner of attaching the junction blocks 10 to the body panel 20. As shown in FIG. 3A, the block bodies 12 are tightening-fixed to the panel sides 20a and 20b of the body panel 20 through the upper and lower attaching brackets 15 and 17, respectively. Specifically, the block bodies 12 are fixed to the body panel 20 in such a manner that tightening screws are inserted into the passing-through holes 15a and 17a of the attaching brackets 15 and 17 so that the tightening screws are threaded into the screw holes of the body panel 20. The wire harness 25 connected to the block bodies 12 through the connectors 25a is pulled out upward from the body panel 20 so that it is arranged along the reinforcing member 21.

The block bodies 12 thus fixed will not be ruptured to fall owing to inadvertent external force such as vibration and shock during vehicle running. The reason is as follows. When the external force different from the pulling force in the vehicle width direction X is applied to the block body 12, the position of the main stress and that of the recess 15b (FIG. 2A) do not agree with each other so that the stress value does not exceed the tensile strength of the attaching bracket 15 and rupture is not induced.

Figure 3B:
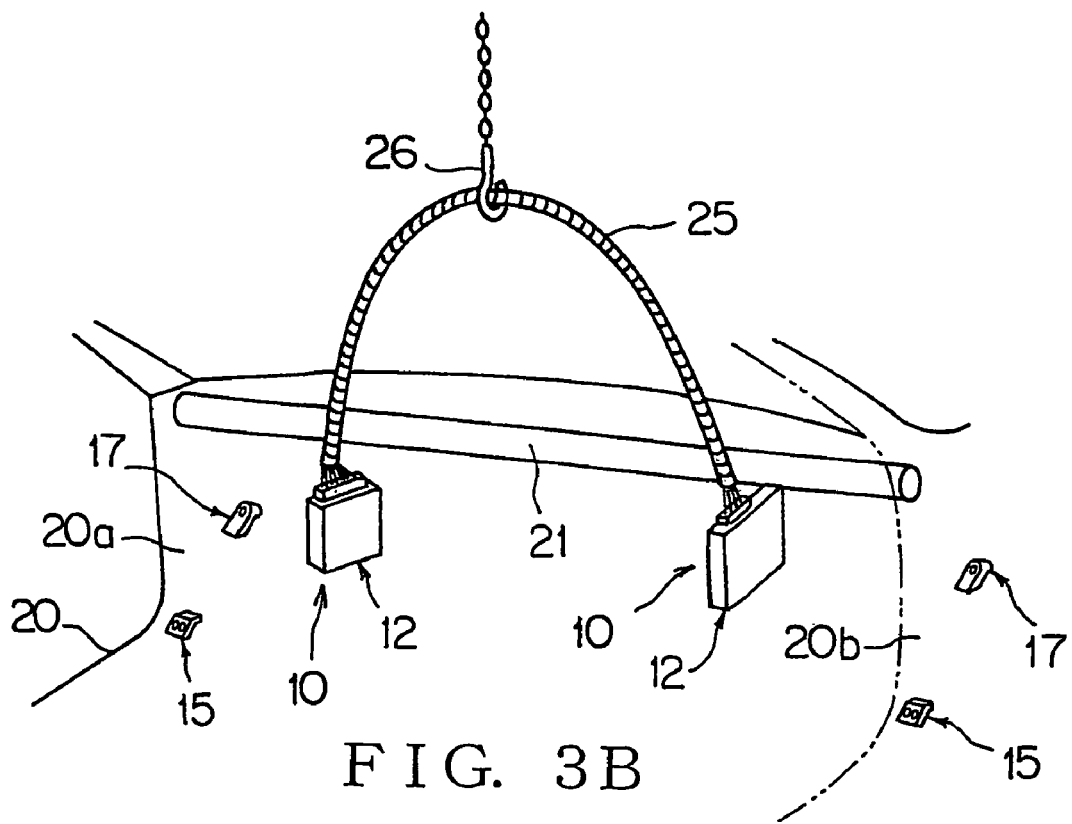
FIG. 3B is a perspective view showing the state where the wire harness and junction box are being recovered when a wire harness has been pulled.

In the recovery of the block bodies 12, as seen from FIG. 3B, with a J hook 26 hung on the wire harness 25, the J hook 26 is pulled upward to pull the wire harness 25 in an F direction at an angle of from θ=45° from the W axis on the plane (0, 1, 1) in three axes (L, W, H) supposed in FIG. 1. Thus, the lower attaching bracket 15 is ruptured. Subsequently, the upper attaching bracket is ruptured. Accordingly, the block bodies 12 as well as the wire harness 25 is lifted upward.

In accordance with this embodiment, the lower attaching bracket 15 will not be ruptured owing to external force such as vibration or shock during vehicle running so that the reliability of the electrical connection during vehicle running is maintained. The lower attaching bracket 15 will be ruptured and separated from the junction block body 12 only when the wire harness 25 is pulled in the vehicle width direction of X in order to recover the junction block 10.

INDUSTRIAL APPLICABILITY

In accordance with the present invention, during recovery of the junction box body, when the electric wire is pulled in a vehicle width direction, the one attaching portion is placed in a pulled state. At this time, stress is concentrated to the rupture inducing portion. When the tensile stress thus concentrated exceeds that of the attaching portion, crack is generated and the one attaching portion is ruptured. Subsequently, the other attaching portion is placed in the pulled state and is likewise ruptured. Therefore, the junction box body can be recovered easily and surely, thereby improving recycling property.

In accordance with the present invention, the planar area of the one attaching portion is reduced so that the value of stress is increased. This is likely to induce rupture, thereby facilitating the recovery of the electric junction box.

In accordance with the present invention, stress is concentrated to each recess. Crack is developed to connect the recesses on both sides to rupture the attaching portion. Therefore, the junction box body can be surely rupture-separated from the attaching portion.

In accordance with the present invention, stress is concentrated to the edge of each of the plurality of holes. Crack is developed to connect the plurality of holes to rupture the attaching portion. The junction box body can be surely rupture-separated from the attaching portion.

In accordance with the present invention, since a rupture inducing portion is located at a position where main stress exists on the one attaching portion when the wire harness is pulled, the stress to be concentrated to the rupture inducing portion is increased. Therefore, the junction box body can be surely ruptured from the attaching portion.

In accordance with the present invention, when the electric wire is pulled, the electric wire is prevented from being broken before the junction box body is ruptured from the attaching portion. Therefore, the junction box body can be surely rupture-separated from the attaching portion so that the electric junction box can be recovered.

The invention claimed is:

1. An attaching structure for an electric junction box with a junction box body, the box body having an upper wall, lower wall, front wall and rear wall and side walls, fixed to a vehicle body through attaching portions, the box body being rupture-separated from the attaching portion during recovery of the junction box body, wherein the attaching portions are provided diagonally on the upper and lower walls of the junction box body, the attaching portions aligned diagonally relative to each other, one attaching portion projecting from the upper wall adjacent the front wall and another attaching portion projecting from the lower wall adjacent the rear wall, and one of the attaching portions, which is to be subjected to a pulling force, is provided with a rupture inducing area so that when an electric wire derived from the junction box body is pulled during recovery of the junction box body, the junction box body is rupture-separated from the attaching portion at the rupture inducing area such that only when L is a direction in which the front and rear walls are opposite, W is a direction in which both side walls are opposite and H is a direction in which the upper and lower walls are opposite, and when the box body is pulled in a direction F, at an angle from the W axis on the plane (0, 1, 1) in the three axes (L, W, H) orthogonal to each other, does an attaching portion rupture separate from the box body.

2. An attaching structure for an electric junction box according to claim 1, wherein said rupture inducing area is a recess and/or hole.

3. An attaching structure for an electric junction box according to claim 2, wherein said recess is provided at each of both sides of the attaching portion.

4. An attaching structure for an electric junction box according to claim 2, wherein said hole is one of a plurality of holes made in said one attaching portion.

5. An attaching structure for an electric junction box according to claim 1, wherein said rupture inducing area is located at a position where main stress is applied to the one attaching portion.

6. An attaching structure for an electric junction box according to claim 1, wherein breakage strength of said attaching portion is smaller than that of said electric wire.

7. An attaching structure for an electric junction box according to claim 3, wherein said hole is one of a plurality of holes made in said one attaching portion.

8. An attaching structure for an electric junction box according to claim 2, wherein said rupture inducing area is located at a position where main stress is applied to the one attaching portion.

9. An attaching structure for an electric junction box according to claim 3, wherein said rupture inducing area is located at a position where main stress is applied to the one attaching portion.

10. An attaching structure for an electric junction box according to claim 4, wherein said rupture inducing area is located at a position where main stress is applied to the one attaching portion.

11. An attaching structure for an electric junction box according to claim 7, wherein said rupture inducing area is located at a position where main stress is applied to the one attaching portion.

12. An attaching structure for an electric junction box according to claim 2, wherein breakage strength of said attaching portion is smaller than that of said electric wire.

13. An attaching structure for an electric junction box according to claim 3, wherein breakage strength of said attaching portion is smaller than that of said electric wire.

14. An attaching structure for an electric junction box according to claim 4, wherein breakage strength of said attaching portion is smaller than that of said electric wire.

15. An attaching structure for an electric junction box according to claim 7, wherein breakage strength of said attaching portion is smaller than that of said electric wire.

16. An attaching structure for an electric junction box according to claim 5, wherein breakage strength of said attaching portion is smaller than that of said electric wire.

17. An attaching structure for an electric junction box according to claim 8, wherein breakage strength of said attaching portion is smaller than that of said electric wire.

18. An attaching structure for an electric junction box according to claim 9, wherein breakage strength of said attaching portion is smaller than that of said electric wire.

19. An attaching structure for an electric junction box according to claim 10, wherein breakage strength of said attaching portion is smaller than that of said electric wire.

20. An attaching structure for an electric junction box according to claim 11, wherein breakage strength of said attaching portion is smaller than that of said electric wire.

* * * * *